United States Patent Office 3,242,151
Patented Mar. 22, 1966

3,242,151
HETERO-O-CYCLIC TELOMERS
Daniel Porret, Basel, Switzerland, assignor to Ciba Limited, Basel, Switzerland, a Swiss company
No Drawing. Filed Aug. 22, 1961, Ser. No. 133,047
Claims priority, application Switzerland, Aug. 26, 1960, 9,660/60
6 Claims. (Cl. 260—88.3)

Telomerization is a known reaction in which an ethylenically unsaturated monomer (the so-called "taxogen" or "compound A") is reacted with a so-called telogen of the formula YZ, whereby a telomerizate is obtained the termini of which are saturated in a previously determined manner by atoms or atomic groups of the telogen Y and Z.

It has now been found that telomerizates having properties that are extremely valuable to industry are obtained when a telogen is reacted upon an ethylenically unsaturated compound, which in addition contains at least one carbocyclic five-membered or six-membered ring with at least one epoxide or epoxidizable group in the ring and, if desired, other monomers, in such manner that the average telomerization degree is at most 20.

Accordingly, the present invention provides new telomerizates of the formula (I) 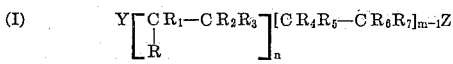

where Y and Z each represents an atom or atomic grouping formed by cleavage of a telogen YZ (Z represents as a rule a hydrogen or halogen atom and Y a lower organic radical), where $R_1$ and $R_7$ each represents a hydrogen or halogen atom or an organic substituent, R stands for an organic radical containing at least one carbocyclic five-membered or six-membered ring with at least one epoxide or epoxidizable group present in the ring, and $n$ and $m$ are small numbers, the sum $$[n+(m-1)]$$

being at least 1 and at most 20, and preferably at least 2 and at most 10, in which the order of disposition of the individual structural units

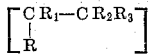

and $[CR_4R_5-CR_6R_7]$ in the chain is optional. When in the above Formula I one or several of the radicals $R_1$ to $R_7$ are organic substituents, they may of course also contain epoxide groups.

According to the present process the new telomerizates are obtained by reacting 1 molecular proportion of a telogen of the Formula YZ with $n$ molecular proportions of a monomer of the formula (II) 

and, if desired, further with $(m-1)$ molecular proportions of a monomer of the formula (III) 

in which formulae the radicals R and $R_1$ to $R_7$ have the above meanings—preferably in the presence of a catalyst capable of supplying free radicals and, if desired, thereupon epoxidizing any epoxidizable groups present in the telomerizate.

The monomers or taxogens of the Formula III contain at least one carbocyclic five-membered or six-membered ring with at least one epoxide or epoxidizable group present in the ring. As examples of such five-membered and six-membered rings with endocyclic epoxide groups there may be mentioned the 3:4-epoxycyclohexyl-1 radical and the 2:3-epoxycyclopentylene-1:5 radical.

Typical taxogens (II) containing such groupings are, for example, 1-vinyl-3:4-epoxycyclohexane; alkenyl esters of 3:4-epoxycyclohexane-carboxylic acids such as 3:4-epoxycyclohexane-carboxylic acid allyl esters and 3:4-epoxycyclohexane-carboxylic acid vinyl esters; alkenyl esters of a 3:4-epoxycyclohexylmethanol such as 3:4-epoxy-6-methylcyclohexylmethyl crotonate and 3:4-epoxy-6-methylcyclohexylmethyl acrylate; monoepoxides of the formula

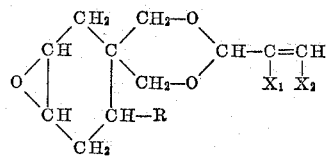

where R represents a hydrogen atom or a methyl radical and $X_1$ and $X_2$ each represents a hydrogen atom or a methyl group; furthermore monoepoxides of the formula

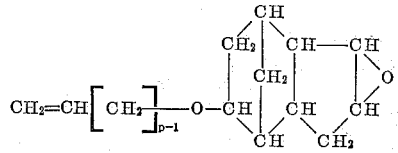

where $p=1$ or 2.

The term "epoxidizable group" describes primarily an epoxidizable carbon-to-carbon double bond. Such double bonds can be oxidized to the 1:2-epoxide group by treatment with, for example, an organic per-acid.

The term "epoxidizable group" further refers to halohydrin groupings of the formula

(where Hal is a halogen atom). It is known that such a halohydrin grouping can likewise be converted into a 1:2-epoxide group by treatment with a dehydrohalogenating agent.

As examples of carbocyclic five-membered and six-membered rings containing such endocyclic epoxidizable groups there may be mentioned the $\Delta^3$-cyclohexenyl radical and the $\Delta^2$-cyclopentylene radical.

Typical taxogens (II) containing such groups are, for example, 1-vinyl-cyclohexene-3; alkenyl esters of 3:4-cyclohexenecarboxylic acids such as 3:4-cyclohexenecarboxylic acid allyl ester and 3:4-cyclohexenecarboxylic acid vinyl ester; alkenyl esters of a 3:4-cyclohexenylmethanol such as 6-methyl-3:4-cyclohexenylmethyl crotonate and 6-methyl-3:4-cyclohexenyl acrylate; unsaturated cyclic acetals of the formula

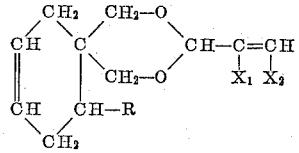

where R represents a hydrogen atom or a methyl group and $X_2$ a hydrogen atom or a methyl group; unsaturated cyclic ethers of the formula

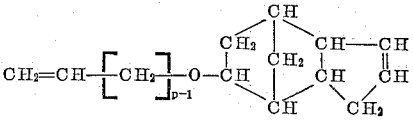

where $p=1$ or 2.

When in the Formula I $m=1$, the product is a homotelomerizate obtained by homotelomerization of a taxogen (II). On the other hand, when in the Formula I $m$ is a whole number greater than 1, the resulting products are cotelomerizates of taxogen (II) with a taxogen (III). Since in general the conditions for the homotelomerization and the cotelomerization are substantially identical, the term "telomerization" as used in this connection covers both types of the reaction.

As cotaxogens (III), which if desired, may be cotelomerized with the taxogens (II) containing epoxide or epoxidizable groups there are suitable those which contain a carbon-to-carbon double bond, more especially a group $H_2C=C<$; there may be mentioned polymerizable olefines such as ethylene, propylene, butene, isobutylene, amylene, hexylene, butadiene; halogenated olefines such as vinyl fluoride, fluoroprene, vinylidene fluoride, difluoroethylene, trifluoroethylene, tetrafluoroethylene, difluoromonochloroethylene, dichloro-monofluoroethylene, trifluoro-chloroethylene, difluoro-dichloroethylene, perfluoropropene, perfluorobutene, vinyl chloride, vinylidene chloride, trichloroethylene, chloroprene, tetrachloroethylene, perchloropropene; vinyl ethers such as vinylmethyl ether, vinylethyl ether, vinylphenyl ether; vinylaryl compounds such as styrene, $\alpha$-methylstyrene and other substituted styrenes; furthermore compounds of the acrylic series such as esters of acrylic or methacrylic acid with alcohols or phenols, for example ethyl acrylate, butyl acrylate, dodecyl acrylate, methyl methacrylate, acrylonitrile, methacrylonitrile; furthermore analogous derivatives of $\alpha$-fluoroacrylic acid, $\alpha$-chloroacrylic acid, crotonic acid, maleic acid or fumaric acid; furthermore cotaxogens containing epoxide groups, such as allyl glycidyl ether, monoepoxybutadiene, or monoepoxydivinylbenzene.

It is, of course, also possible to cotelomerize taxogens of the Formula II that contain different epoxide groups, and also to manufacture ternary, quaternary or higher cotelomers by cotelomerizing 3 or more different taxogens of the Formula II and/or III.

Suitable telogens YZ are compounds such as are conventionally used for this purpose; there may be mentioned: halogen-hydrocarbons such as carbon tetrachloride, carbon tetrabromide, chloroform, chloro-iodo methane, methylene chloride, methylene bromide, methylene iodine, methyl iodide, monobromo-monochloro-difluoromethane, dibromo-difluoromethane, bromodichloromethane, iodotrifluoromethane, acetylene tetrachloride, perchloroethane, hexachlorocyclohexane, benzotrichloride; halogenated esters such as mono- and dichloroacetic acid methyl esters, diethylbromo malonate; trichloroacetyl chloride; haloalkylnitriles such as trichloroacetonitrile, $\alpha$-chloronitroalkanes, alkylbenzenes such as isopropylbenzene; aldehydes such as formaldehyde, acetaldehyde, benzaldehyde, $\Delta^3$-tetrahydrobenzaldehyde; ketones such as, primarily, cyclohexanone; acetals such as dimethylformal, dioxolan; carboxylic acids and their esters and anhydrides, such as acetic acid, isobutyric acid, methyl formate and ethyl formate; alcohols such as methanol, ethanol, isopropanol, lauryl alcohol; sulfur-containing compounds such as hydrogen sulphide mercaptans, thiophenols, sodium bisulfite; aromatic sulfonylchloride; phosphorus compounds such as, primarily, dialkylphosphonates or dialkylphosphites, for example dimethylphosphite or diethylphosphite; silicon compounds such as silicon tetrachloride, trichlorosilane, silane, alkyl silanes; inorganic halogen compounds such as molecular chloride, molecular iodine, cyanogen chloride, hydrohalic acids such as hydrochloric acid.

The telomerization of the invention may be carried out in known manner in the presence of a conventional telomerization catalyst, for example within a temperature range of 0 to 200° C., advantageously at an elevated temperature ranging from 50 to 150° C. and under a pressure such as allows the reactants to remain liquid. The process can be performed batchwise or continuously.

Since, as the proportion of the telogen in the reaction mixture rises, the telomerization degree $n$ and/or the average molecular weight of the telomerizate generally drops, it is in most cases of advantage to use an excess of the telogen. If desired, the reaction can be carried out in the presence of an inert solvent or diluent, such as benzene, octane or hexadecane. If desired, the different telomer fractions can be isolated by conventional methods, such as distillation or solvent extraction.

Preferred telomerization catalysts are the usual catalysts capable of forming free radicals; there may be mentioned: hydrazine derivatives, for example hydrazine hydrochloride, organo-metal compounds such as lead tetraethyl, and more especially aliphatic azo compounds such as $\alpha:\alpha'$-azoisobutyrodinitrile and organic peroxides or persalts such, for example, as peracetic acid, acetyl peroxide, chloroacetyl peroxide, trichloroacetyl peroxide, benzoyl peroxide, chlorobenzoyl peroxide, benzoylacetyl peroxide, propionyl peroxide, fluorochloro-propionyl peroxide, lauroyl peroxide, cumene hydroperoxide, tertiary butyl hydroperoxide, di-tertiary-butyl peroxide, di-tertiary amyl peroxide, para-menthane hydroperoxide, hydrogen peroxide, sodium peroxide, alkali metal percarbonates, alkali metal persulfates or alkali metal perborates. The requisite amount of catalyst depends in known manner on the course the reaction is desired to take or on the properties the polymer is desired to possess; it is of advantage to use about 0.05 to 10% by weight of the catalyst calculated on the total weight of the monomer or monomers or taxogen or taxogens, and it is of advantage to add part of the catalyst portionwise in the course of the telomerization at the same rate as it is consumed.

In certain cases it is also possible to use cationic anionic catalysts. Among the former there may be mentioned Lewis acids such as $HClO_4$, $H_2SO_4$, $BF_3$, $SnCl_4$, $SbCl_5$ and $AlCl_3$, also metal salts such as the halides of beryllium, calcium, magnesium, strontium, barium, iron, zinc, tin or titanium.

Suitable anionic catalysts are Lewis bases, for example metal alkyls or strong bases, such as sodium hydroxide. Telomerization can also be brought about by means of actinic rays, even without addition of a catalyst.

The telomerizates of the invention contain either epoxide groups or epoxidizable groups, such as an epoxidizable carbon-to-carbon double bond or a halohydrin group.

The telomerizates of the latter kind can likewise be converted into corresponding telomerizates containing expoxide groups by treatment with an epoxidizing agent.

The epoxidation of the carbon-to-carbon double bonds is carried out by a conventional method, preferably with the aid of an organic per-acid such as peracetic, perbenzoic, peradipic or monoperphthalic acid, or with a mixture of hydrogen peroxide with an organic acid, or similar means. Furthermore, there may be used as epoxidizing agent hypochlorous acid, and in this case in a first stage hypochlorous acid is added on to the double bond, whereupon in a second stage the epoxide group is formed by treatment with an agent splitting off hydrochloric acid, for example with a strong alkali.

The conversion of the halohydrin groups into epoxide groups is likewise performed in known manner by treatment with an agent capable of splitting off a hydrohalic acid, such as potassium hydroxide or sodium hydroxide.

The new homotelomerizates and cotelomerizates containing epoxide groups react with the conventional curing agents for epoxy compounds; they can, therefore, be cross-linked or cured by the addition of such curing agents, like other polyfunctional epoxy compounds or epoxy resins. As such curing agents there may be used basic or primarily acidic compounds; there are suitable, for example, amines ar amides such as aliphatic or aromatic primary, secondary or tertiary amines, for example mono-, di- and tributylamines, para-phenylenediamine, ethylendiamine, N:N-diethylethylenediamine, diethylenetriamine, triethylenetetramine, tetraethylenepentamine, trimethylamine, diethylamine, triethanolamine, Mannich's bases, piperidine, piperazine, guanidine and guanidine derivatives such as phenyldiguanidine, diphenylguanidine, dicyandiamide; formaldehyde resins with aniline, urea or melamine; polymers of aminostyrenes; polyamides, for example those from aliphatic polyamines and dimerized or trimerized unsaturated fatty acids; isocyanates, isothiocyanates; polyhydric phenols, for example resorcinol, hydroquinone, quinone, phenolaldehyde resins, oil-modified phenolaldehyde resins; reaction products of aluminum alcoholates or phenolates with compounds of tautomeric reaction of the type of acetoacetic acid; Friedel-Crafts catalysts, for example aluminum trichloride, antimony pentachloride, tin tetrachloride, ferric chloride, zinc chloride or boron trifluoride or their complexes with organic compounds; boroxines such as trimethoxyboroxine; metal fluoborates such as zinc fluoborate; phosphoric acid; salts of acid reaction such as, for example, zinc nitrate, diammonium phosphate or diammonium silicofluoride; polybasic carboxylic acids and anhydrides thereof, for example phthalic anhydride, methyl-endomethylene-tetrahydrophthalic anhydride, hexahydrophthalic anhydride, dodecenylsuccinic anhydride, hexachloro-endomethylene-tetrahydrophthalic anhydride or mixtures of said anhydrides; maleic or succinic anhydride, if desired in conjunction with an accelerator, such as a tertiary amine.

The term "curing" as used in this context refers to the conversion of any one of the afore-mentioned, substantially linear telomers containing epoxide groups into cross-linked insoluble and infusible resins.

The homotelomerizates and cotelomerizates obtained by the present process can be used for a wide variety of purposes. They are liquid or solid, fusible substances that can be used for all purposes in which curable condensation resins and/or polymerization resins are generally employed. They can be used by themselves or in admixture with curing agents; also in combination with other curable condensation resins such, for example, as aminoplasts, phenoplasts, epoxy resins, polyacetals from polyalcohols and aldehydes, and similar products, either without or with fillers, and in solution or emulsion as textile assistants or textile dressings, as binders for pigment dyeings and prints on textile materials, more especially those of synthetic fibers, for example polyamide, polyester or polyacrylonitrile fibers; lacquers, varnishes, paints, dipping or casting resins, coating compositions, pore fillers and putties, adhesive and the like, and also for the manufacture of such products. Telomerizates prepared from chlorine-containing telogens are in general distinguished by their outstanding inflammability.

The following examples illustrate the invention. Parts and percentages are by weight.

The telomerizates of the invention, described in Examples 1, 2 and 4 to 14, were manufactured with the use of the following monomers not yet described in the literature:

PRODUCTS Ia AND Ib (a) *Acetal from acrolein and 1:1-bis-[hydroxymethyl]-cyclohexene-3*

A mixture of 286 parts of 1:1-bis-[hydroxymethyl]-cyclohexene-3, 118 parts of acrolein and 3 parts of sulfuric acid of 50% strength is stirred and heated on an oil bath to an external temperature of 80° C., and after 30 minutes 350 parts by volume of benzene are dropped in. The temperature of the oilbath is then raised to 120 to 130° C. and the water formed during the reaction is continuously distilled off azeotropically in a cyclic distillation apparatus (see the article by H. Batzer and coworkers in "Die makromolekulare Chemie," No. 7, pages 84–85 [1951]). After 2 hours the benzene is removed under reduced pressure. The residue (344 parts) is treated with 1.5 parts of sodium acetate and distilled under vacuum. The acetal (3-vinyl-2:4-dioxospiro(5:5)-undecene-9) passes over at 94–99° C. under 6 mm. Hg pressure.

Yield: 226 parts (=62.5% of the theoretical).
Specific gravity $n_D^{20}=1.4908$.

(b) *Epoxidation.*—900 parts of the acetal prepared as described under (a) above are dissolved in 2250 parts of benzene, 100 parts of sodium acetate are added, and 1045 parts of peracetic acid of 40% strength are cautiously stirred in dropwise at 25–30° C. After about 4 hours 100% of the calculated peracetic acid has been converted. The reaction mixture is then agitated in a separating funnel with 3 x 200 parts by volume of water and 4 x 300 parts by volume of saturated sodium carbonate solution (until an alkaline reaction has been established), dried over sodium sulfate, and the benzene is distilled off under reduced pressure.

The epoxidized acetal (3-vinyl-2:4-dioxospiro-(5:5)-9:10-epoxyundecane) of the formula

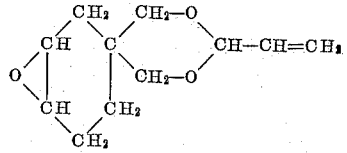

distills at 90 to 98° C. under 0.5 to 0.6 mm. Hg pressure.
Yield: 739 parts (=75.5% of the theoretical).
Epoxide content: 5.14 (theoretical: 5.1) epoxide groups per kg.
Determination of double bonds: 6.0 (theoretical content: 5.1) double bonds per kg.

PRODUCTS IIa AND IIb (a) *Allyl dihydrodicyclopentadienyl ether*

(1) *From dihydrodicyclopentadienol-8 and allyl chloride.*—75 parts (0.5 mol) of 8-hydroxydihydrodicyclopentadiene are heated to 95° C. and 1.5 parts of sodium are added. The whole is then heated to about 150° C. until all sodium has dissolved, cooled to about 95° C., and 5.5 parts of allyl chloride are dropped in, whereupon the mixture is again heated until refluxing ceases at 130° C. A second portion of sodium (1.5 parts) is then added at 140° C., and the mixture is once more heated to about 160° C. until all sodium has dissolved, then cooled to 120° C., another portion (5.5 parts) of allyl chloride is added, and the alternate addition of sodium and allyl chloride is repeated until a total of 11.5 parts (0.5 mol) of sodium and 42 parts (0.55 mol) of allyl chloride have been added, which is the case after a total of about 3¾ hours. The mixture is then cooled to 25° C. and the precipitated sodium chloride is caused to dissolve by adding 100 parts by volume of water. The layers are then separated and the organic phase is taken up with 100 parts by volume of ether, dried over calcium chloride, the ether is expelled and the residue fractionated, to yield 72 parts of allyl dihydrodicyclopentadienyl ether of the formula.

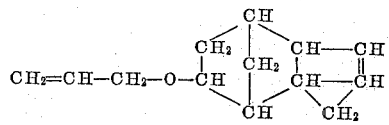

boiling at 122–124° C. under 19 mm. Hg pressure, which corresponds to a yield of 76% of the theoretical calculated on the hydroxydihydrodicyclopentadiene used as starting material, or to a yield of 68.5% calculated on allyl chloride.

(2) *From dicyclopentadiene and allyl alcohol.*—A mixture of 792 parts of dicyclopentadiene, 492 parts of allyl alcohol and 15 parts of concentrated sulfuric acid is heated for 9 hours at the boil. During this time the boiling temperature rises from 80 to 101° C. After 5 hours 8 parts of concentrated sulfuric acid are added. The reaction product is allowed to cool, neutralized with 15 parts of anhydrous sodium carbonate, and then subjected to fractional distillation, to yield

| At ° C. | Under mm. Hg | Parts | Product |
|---|---|---|---|
| 35 | 60 | 252 | Allyl alcohol. |
| 38 | 0.3 | 189 | Dicyclopentadiene. |
| 67–72 | 0.2 | 605 | Allyl dihydrodicyclopentadienyl ether. | leaving 137 parts of a residue which was not identified. The yield amounts to 92% of the theoretical calculated on allyl alcohol, or 70% calculated on dicyclopentadiene.

(b) *Monoepoxy allyl tetrahydro-dicyclopentadienyl ether*

In the course of 15 minutes 224 parts of peracetic acid of 43.2% strength are stirred dropwise at 30° C. into a mixture of 238 parts of allyl dihydrodicyclopentadienyl ether, 640 parts of benzene and 224 parts of sodium acetate. The mixture is maintained for 2½ hours at 30° C. The aqueous phase is then separated, the organic layer is washed twice with 120 parts by volume of water, and the residual acid is neutralized by extraction with 44 parts of sodium hydroxide solution of 30% strength, then once more washed with water and concentrated. The last remnants of the solvent are expelled by heating at 90° C. under 0.2 mm. Hg pressure. In this manner there are finally obtained 225 parts of a mobile, slightly yellowish liquid containing 4.40 (=90.5% of the theoretical content) of epoxide equivalents per kg. The liquid consists substantially of the epoxide of the formula

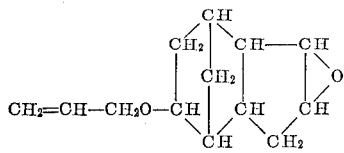

PRODUCT III.—VINYLDICYCLOPENTADIENYL ETHER

A reaction vessel (capacity: 2 parts by volume) is charged with 570 parts of dihydrodicyclopentadienol-8, scavenged with nitrogen and then heated to 100° C. 5 parts of sodium metal are then stirred in in small portions. After 15 minutes all sodium has dissolved. The mixture is cooled and the alcoholic solution which contains alcoholate is transferred to an autoclave of 2½ parts by volume capacity. The autoclave is heated to 120° C while being scavenged with nitrogen. Nitrogen is then injected up to a pressure of 7 kg. per square centimeter and then acetylene to a total pressure of 19 kg. per square centimeter. The whole is heated to 165° C., whereby the total pressure is caused to rise initially to 26 kg. per square centimeter, and then it drops again. Every time the pressure has dropped to 12 kg. per square centimeter it is raised again to 19 kg. per square centimeter by injecting more acetylene. The acetylene absorption takes 11 hours, a total of 90 parts by volume of acetylene (measured at room temperature under atmospheric pressure) being consumed. The autoclave is then allowed to cool off and discharged.

Yield: 649 parts of crude product which is distilled, to yield 487 parts of commercially pure vinyldihydrodicyclopentadienyl ether of the formula

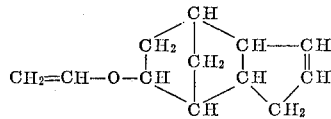

in the form of a liquid which passes over at 62–70° C. under 0.25 mm. Hg pressure.

The determination of the double bonds by catalytic hydrogenation revealed a content of 10.4 double bonds per kg. (=92% of the theoretical content). There remained 122 parts of a residue which could not be distilled and was not identified.

EXAMPLE 1

A mixture of 600 parts of carbon tetrachloride, 300 parts of the acetal from 1:1-bis-[hydroxymethyl]-Δ³-cyclohexene and acrolein (Product Ia) and 4 parts of benzoyl peroxide is heated to 26 hours at the boil. The internal temperature is about 88–89° C. Every other hour 0.5 part of benzoyl peroxide is added. The total amount of catalyst added is thus 9 parts. The mixture is then cooled and distilled. 445 parts of unreacted carbon tetrachloride and 206 parts of unreacted monomeric acetal are recovered. There remain 128 parts of a yellow, highly viscous product which contains 18.5% of chlorine and 4.15 double bonds per kg., corresponding to an average degree of telomerization of about 3.4.

279 parts of the resulting telomerization product are dissolved in 750 parts of benzene. The solution is treated with 15 parts of anhydrous sodium acetate, and in the course of 15 minutes 252 parts of peracetic acid of 43.2% strength are added, whereupon the mixture is stirred for 3 hours. During the whole opeartion the temperature is kept constant at 35° C. The aqueous phase is separated and the organic phase is washed with 3 x 175 parts by volume of water; at the third washing the residual acid is neutralized with 15 parts of sodium hydroxide solution of 30% strength. Two further washings with 70 parts of water each are then carried out. The benzene is then distilled off and finally concentrated in a high vacuum, to yield 285 parts of a bright yellow product which solidifies after having cooled to room temperature. It contains 2.79 epoxide equivalents per kg. and consists substantially of telomers of the formula

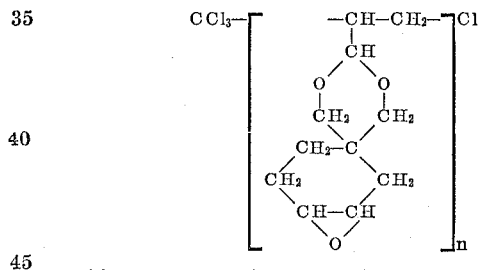

This product can be cured with acid anhydrides.

EXAMPLE 2

A mixture of 200 parts of carbon tetrachloride, 100 parts of the epoxidized acetal from 1:1-bis-[hydroxymethyl]-Δ³-cyclohexene and acrolein (Product Ib) and 2 parts of benzoyl peroxide is heated to the boil (86° C.). After 5 hours 1 part of benzoyl peroxide is added. Any unreacted carbon tetrachloride is distilled off after 18 hours, and the product is concentrated in vacuum up to a final temperature of 100° C. under 0.1 mm. Hg pressure. 125 parts of a telomer remain which solidifies on cooling to room temperature. It contains 17.5% of chlorine and 2.25 epoxide equivalents per kg. This product can be cured with acid anhydrides.

Compared with Example 1, the telomerization of the epoxidized monomeric acetal proceeds in this case almost quantitatively, the proportions of reacted carbon tetrachloride and telomerized acetal being substantially the same as in the telomerization of the non-epoxidized monomeric acetal in Example 1.

EXAMPLE 3

A mixture of 200 parts of carbon tetrachloride, 50 parts of 1-vinyl-3:4-cyclohexene and 0.5 part of benzoyl peroxide is heated for 23 hours at 85° C. In the course of the reaction another 2.5 parts of benzoyl peroxide in portions of 0.5 part each are added. On completion of the reaction any unreacted carbon tetrachloride and vinylcyclohexene are distilled off, to leave 33 parts of a telomer which contains 40.5% of chlorine and 2.7 double bonds per kg., corresponding to an average degree of telomerization of about 1.8.

A solution of 130 parts of the product described above in 90 parts of benzene is treated with 10 parts of anhydrous sodium acetate and 133 parts of peracetic acid of 43.2% strength in the course of 10 minutes at 35° C. with vigorous stirring. The mixture is stirred on for 2½ hours at 35° C. The aqueous layer is then separated; the organic layer is washed with 3 x 100 cc. of water; at the third washing the mixture is neutralized with 12 parts of sodium hydroxide of 30% strength, whereupon the benzene is distilled off. There remain 132 parts of a yellow liquid containing 2.8 epoxide equivalents per kg. and consisting substantially of telomers of the formula

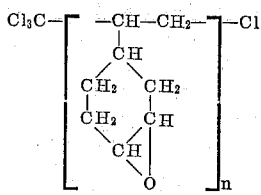

When the telomer is treated at 50° C. with sodium hydroxide solution, part of the combined chlorine undergoes hydrolysis, whereby the content of double bonds and/or epoxide groups respectively is increased. The final product obtained in this manner contains 3.25 instead of 2.8 epoxide equivalents per kg.

EXAMPLE 4

A mixture of 83 parts of epoxy-tetrahydrodicyclopentadienyl allyl ether (Product IIb), 165 parts of carbon tetrachloride and 0.5 part of benzoyl peroxide is refluxed for 24 hours. During this time 2.5 parts of benzoyl peroxide are added in portions of 0.5 part each at 4 hour intervals. The excess carbon tetrachloride is then distilled off, and there are obtained 98 parts of a clear, yellow liquid containing 3.76 epoxide equivalents per kg. and 11.4% of chlorine. The product consists substantially of telomers of the formula

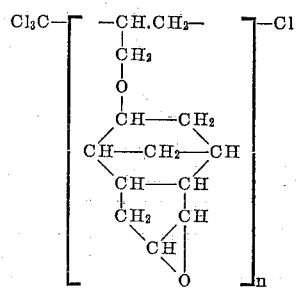

It can be cured in known manner with acid anhydrides.

EXAMPLE 5

A mixture of 200 parts of carbon tetrachloride, 100 parts of dihydrodicyclopentadienyl allyl ether (Product IIa) and 2 parts of benzoyl peroxide is heated for 15 hours at the boil. The internal temperature is about 88 to 89° C. Every other hour 0.5 part of benzoyl peroxide is added. The total of catalyst added thus amounts to 5 parts. The mixture is then cooled and distilled, 152 parts of carbon tetrachloride and 80 parts of monomeric acetal being recovered, which have not undergone reaction. There remain 26 parts of a dark, viscous product which contains 21.9% of chlorine, corresponding to an average telomerization degree of about 2.2.

A solution of 66 parts of the resulting telomerization product are dissolved in 189 parts of benzene, treated with 5 parts of anhydrous sodium acetate, and in the course of 15 minutes 61 parts of peracetic acid of 43.2% strength are added. The mixture is stirred for 3 hours. The temperature is kept constant at 35° C. during the whole operation. The aqueous layer is then separated and washed 3 times with 50 parts by volume of water, and at the third time the acid is neutralized with 8 parts of sodium hydroxide solution of 30% strength, and the mixture is then washed twice more with 30 parts of water. The benzene is then distilled off and the whole is finally concentrated in a high vacuum, to yield 60 parts of a dark product which solidifies after cooling to room temperature. It contains 2.45 epoxide equivalents per kg. and can be cured with acid anhydrides.

EXAMPLE 6

A mixture of 50 parts of dihydrodicyclopentadienyl vinyl ether (Product III), 100 parts of carbon tetrachloride and 0.5 part of benzoyl peroxide is refluxed for 19 hours. At intervals of 5 to 6 hours further additions of 0.5 part each of benzoyl peroxide are made and the unreacted carbon tetrachloride is then distilled off. Finally, the product is dried at 60° C. internal temperature under 0.3 mm. Hg pressure to remove last remnants of volatile matter. There remain 51 parts of a dark-colored solid residue which contains 8.6% of chlorine, corresponding to an average degree of telomerization of about 9.

91 parts of the telomerization product thus prepared are dissolved in 270 parts of benzene and treated with 5 parts of anhydrous sodium acetate. While stirring the whole well, 100 parts of peractic acid of 43.2% strength are added dropwise within 10 minutes at 35° C. and the whole is maintained for 2½ hours longer at 35° C. The aqueous layer is then separated and the organic layer is worked up as described in Example 3. Finally there is obtained a residue (85 parts) in the form of a dark-colored, solid substance which contains 4.5 epoxide equivalents per kg. and consists substantially of telomers of the formula

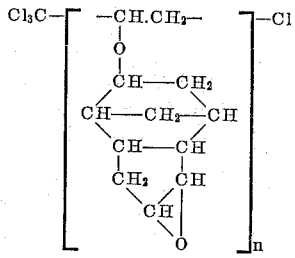

EXAMPLE 7

A mixture of 180 parts of the acetal from 1:1-bis-[hydroxymethyl]-Δ³-cyclohexene and acrolein (Product Ia), 55 parts of thiophenol and 1 part of benzoyl peroxide is heated for 2 hours at 90° C. At the beginning a slight evolution of heat is observed. The reaction mixture is then subjected to fractional distillation, whereby 20 parts of unreacted thiophenol and 103 parts of unreacted acetal are recovered. As residue there are obtained 105 parts of the telomerization product of the formula

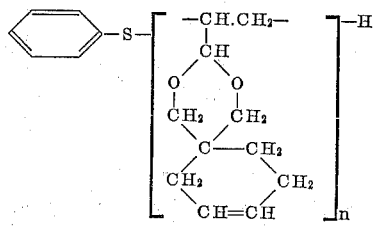

which contains 9.2% of sulfur, corresponding to a content of about 1.4 mols of acetal for every mol of thiophenol.

The telomerizate can be epoxidized with peracetic acid in the following manner, in addition to the double bond also the mercapto-sulfur atom being oxidized to the sulfone groupe so that 3 equivalents of oxygen are consumed:

A mixture of 102 parts of the above telomerization product, 270 parts of benzene and 10 parts of anhydrous sodium acetate is heated to 35° C. and in the course of 1 hour, with vigorous stirring, 179 parts of peracetic acid of 43.2% strength are added dropwise. Stirring is continued for 2½ hours at the same temperature. The aqueous layer is then separated, and the benzene layer is washed and neutralized as described in Example 3 and then evaporated to yield 87 parts of a highly viscous, colorless liquid containing 2.49 epoxide equivalents per kg.

EXAMPLE 8

A mixture of 180 parts of the acetal from 1:1-bis-[hydroxymethyl]-Δ³-cyclohexene and acrolein (Product Ia), 55 parts of Δ³-tetrahydrobenzaldehyde and 1 part of benzoyl peroxide is heated for 20 hours at 100° C., and after 10 hours another 0.5 part of benzoyl peroxide are added. The mixture is then distilled. 48 parts of unreacted Δ³-tetrahydrobenzaldehyde and 168 parts of monomeric acetal are recovered. There remain 18 parts of a yellow, highly viscous residue.

30 parts of the telomerization product described above are mixed with 80 parts of benzene and 2 parts of anhydrous sodium acetate and heated to 35° C., whereupon 35 parts of peracetic acid of 43.2% strength are added dropwise within 20 minutes. The mixture is then stirred for 2 hours at the same temperature. The aqueous layer is then separated and the benzene layer is washed and neutralized as described in Example 3. The solvent is distilled off and there are obtained 29 parts of a highly viscous, colorless product containing 3.75 epoxide equivalents per kg.

EXAMPLE 9

A mixture of 558 parts of the epoxidized acetal from 1:1 - bis - [hydroxymethyl]-Δ³-cyclohexene and acrolein (Product Ib) and 392 parts of cyclohexanone is heated to 150° C., whereupon 1 part of hydrogen peroxide of 85% strength is added. In the course of the subsequent 15 hours 8 parts of hydrogen peroxide of 85% strength are added in portions of 0.75 part each. After 22 hours the experiment is terminated and the product concentrated. 330 parts of unreacted cyclohexanone and 204 parts of unreacted acetal are recovered. There are obtained 429 parts of a bright product which solidifies on cooling to room temperature; it contains 2.92 epoxide equivalents per kg., melts at 60 to 80° C. and consists substantially of telomers of the formula

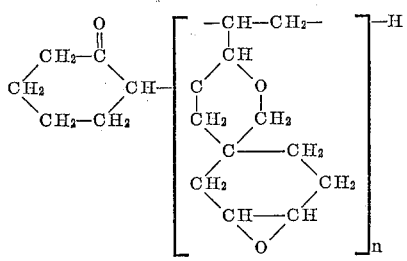

EXAMPLE 10

A mixture of 155 parts of monoepoxy allyl tetrahydrodicyclopentadienyl ether (Product IIb) and 114 parts of cyclohexanone is heated to 125° C. 4 parts of hydrogen peroxide of 85% strength are then stirred in within 20 hours in portions of 0.5 part each. After 22 hours the experiment is discontinued and any unreacted starting materials are distilled off. 98 parts of cyclohexanone and 88 parts of epoxy ether are recovered. There are obtained 80 parts of a yellow, viscous liquid containing 3.2 epoxide equivalents per kg. which consists substantially of telomers of the formula

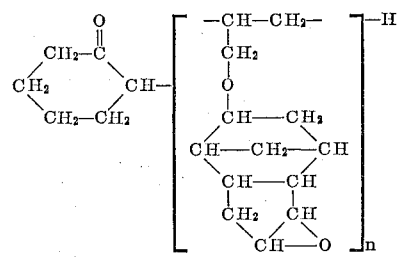

By means of phthalic anhydride the above product can be cured to form clear castings which possess good mechanical properties.

EXAMPLE 11

A mixture of 880 parts of the epoxidized acetal from 1:1 - bis - [hydroxymethyl]-Δ³-cyclohexene and acrolein (Product Ib) and 495 parts of dimethylphosphite is heated to 110° C. and 3 parts of benzoyl peroxide are then stirred in. Thereupon 10 portions of 2 parts each of benzoyl peroxide are added at intervals of 2 hours each. After 22 hours the experiment is discontinued and any unreacted starting materials are distilled off. 445 parts of phosphite and 596 parts of acetal are recovered. Finally, there are obtained 338 parts of a colorless product which after cooling to room temperature solidifies to form an almost completely solid substance; it contains 3.05 epoxide equivalents per kg. and 5.8% of phosphorus and consists substantially of telomers of the formula

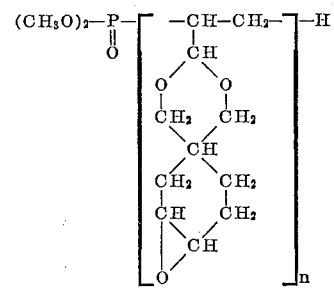

A similar telomer can be prepared as described above by using diethylphosphite instead of dimethylphosphite.

EXAMPLE 12

A mixture of 412 parts of monoepoxy allyl tetrahydrodicyclopentadienyl ether (Product IIb) and 257 parts of dimethylphosphite is heated to 90° C. and 2 parts of benzoyl peroxide are then stirred in. In the course of 20 hours there are then further added 7.5 parts of benzoyl peroxide in portions of 0.75 part each. After 23 hours the experiment is discontinued and any unreacted starting materials are distilled off. 217 parts of dimethylphosphite and 239 parts of epoxy ether are recovered. There remain 213 parts of a yellow, viscous liquid which contains 3.35 epoxide equivalents per kg. and 7.6% of phosphorus and consists substantially of telomers of the formula

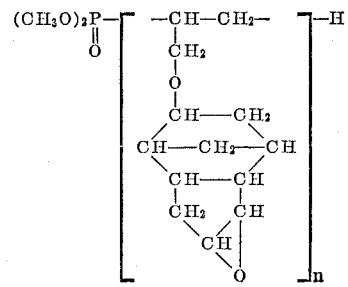

EXAMPLE 13

A mixture of 196 parts of the epoxidized acetal from 1:1-bis-[hydroxymethyl]-Δ³-cyclohexene and acrolein (Product Ib), 106 parts of acrylonitrile and 392 parts of cyclohexanone is heated to 120° C. and 1 part of hydrogen peroxide of 85% strength is then added. After 2 hours and after 4 hours another addition of 0.5 part each of hydrogen peroxide of 85% strength is made. After 5 hours the acrylonitrile no longer boils and the experiment is discontinued. By concentration of the distillate there are recovered from it 15 parts of unreacted acrylonitrile, 350 parts of unreacted cyclohexanone and 30 parts of unreacted acetal. Finally, there remain 260 parts of a yellow product which on cooling to room temperature forms a solid substance; it contains 2.94 epoxide equivalents per kg., melts at 80 to 100° C., and consists substantially of cotelomers of the formula

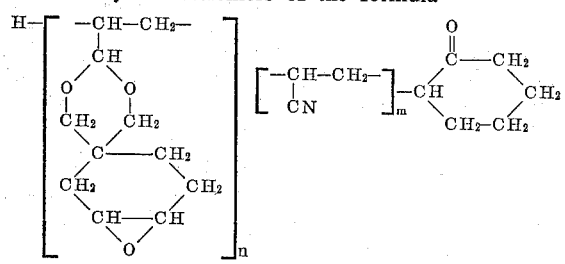

EXAMPLE 14

A mixture of 196 parts of the epoxidized acetal from 1:1-bis-[hydroxymethyl]-Δ³-cyclohexene and acrolein (Product Ib), 104 parts of styrene and 392 parts of cyclohexanone is heated to 105° C., whereupon 1 part of hydrogen peroxide of 85% strength is added. 5 additions of 1 part each of hydrogen peroxide of 85% strength are then made at intervals of 3 hours each. After 17 hours the experiment is discontinued and any unreacted starting materials are distilled off under vacuum; in this manner 310 parts of cyclohexanone and 56 parts of styrene are recovered. There remain 195 parts of a colorless product which after cooling to room temperature forms a solid substance. The product contains 1.39 epoxide equivalents per kg. and consists substantially of cotelomers of the formula

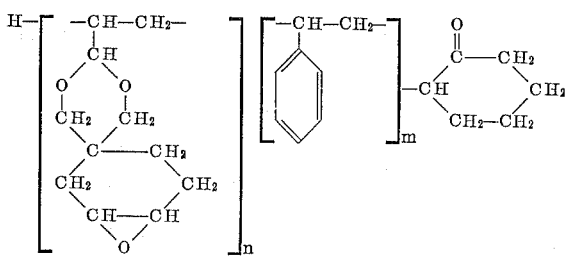

EXAMPLE 15

19.5 parts of phthalic anhydride are dissolved by heating in 80 parts of the epoxidized telomer described in Example 1 (containing 2.79 epoxide equivalents per kg.) and 10 parts of trixylenyl phosphate. The mixture is then cured in aluminum moulds for 24 hours at 160° C. Clear, bright-yellow castings having a Martens value of 145° C. are obtained. In addition, the castings have good mechanical properties and are not flammable.

EXAMPLE 16

60 parts of the telomer prepared as described in Example 11 (containing 3.05 epoxide equivalents per kg.) and 40 parts of an epoxy resin which is solid at room temperature (containing 2.54 epoxide equivalents per kg.), prepared by reacting epichlorohydrin with bis-[4-hydroxyphenyl]-dimethylmethane in the presence of an alkali, are fused at 120° C. with 30.4 parts of phthalic anhydride. The mixture of the resin and the curing agent is cast in an aluminum mould (40 x 10 x 140 mm.) and cured for 24 hours at 140° C. The completely cured, bright casting is self-extinguishing and possesses the following properties:

Bending strength, kg./mm.² _____ 9.3
Heat distortion temperature according to Martens (DIN), ° C. _____ 119
Flammability (VDE) _____ Stage 1
Self-extinction after, seconds _____ 3

EXAMPLE 17

In a first experiment 50 parts of the telomer prepared as described in Example 9 (resin A; containing 2.92 epoxide equivalents per kg.) and 50 parts of a polyglycidyl ether which is solid at room temperature (resin B; containing 2.05 epoxide equivalents per kg.; prepared by reacting epichlorohydrin with bis-[4-hydroxyphenyl]-dimethylmethane in the presence of an alkali) are fused at 120° C. with methyl-"Nadic"-anhydride, using per equivalent of epoxide groups of the resins for the telomer 0.55 and for the polyglycidyl ether 0.85 equivalent of anhydride groups. The mixture of the resin and the curing agent is cast in moulds and cured for 48 hours at 150° C.

In a second test 100 parts of resin B are fused at 120° C. with methyl-"Nadic"-anhydride, using 0.85 equivalent of anhydride groups per equivalent of epoxide group and curing the mixture of the resin and the curing agent as described above.

To test their permanent thermostability the castings were stored for 90 days at 150° C. in a drying cabinet and then their bending strength and shape retention at elevated temperatures according to Martens were determined. The result of these tests are shown below:

| Resin A parts | Resin B parts | Heat distortion temperature according to Martens (DIN) in ° C. | Bending strength kg./mm.² |
|---|---|---|---|
| 50 | 50 | 145 | 9.7 |
| ----- | 100 | 106 | 9.7 |

What is claimed is:
1. Telomers of the formula

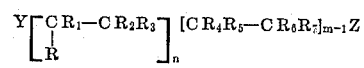

where Y and Z represent the atoms and radicals formed by the scission of a telogen YZ from the group consisting of dialkyl phosphites, cyclohexanone, aldehydes having up to seven carbon atoms, thiophenols and halogenated hydrocarbons having up to seven carbon atoms; $R_1$ to $R_7$ each represents a member selected from the class consisting of hydrogen, halogen atom and lower hydrocarbon radical; R represents an organic radical containing at least one carbocyclic ring with 5 to 6 ring carbon atoms said carbocyclic ring containing in addition at least one 1,2-epoxide group attached to said ring, said epoxide group being a part of said ring; and n and m are small whole numbers, the sum $[n+(m-1)]$ is at least 2 and at most 20, and in which the individual structural units

and $[CH_4R_5—CR_6R_7]$ occur in the telomer chain in any possible sequence.

2. Telomers as claimed in claim 1, whose terminal groups Y and Z have been formed by splitting a dialkylphosphite.

3. Telomers as claimed in claim 1, whose terminal groups Y and Z have been formed by splitting cyclohexanone.

4. Telomers as claimed in claim 1 containing structural units of the formula

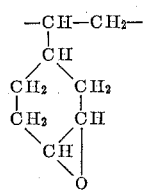

5. Telomers as claimed in claim 1 containing structural units of the formula

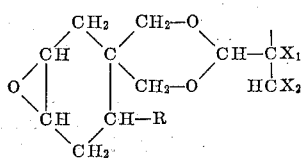

where R is selected from the class consisting of hydrogen atom and methyl group, and $X_1$ and $X_2$ each are selected from the class consisting of hydrogen atom and methyl group.

6. Telomers as claimed in claim 1 containing structural units of the formula

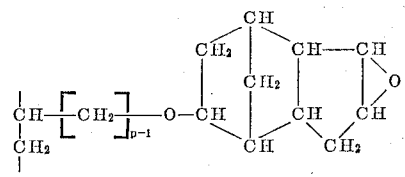

where $p$ is an integer of at least 1 and at the most 2.

References Cited by the Examiner

UNITED STATES PATENTS

| | | | |
|---|---|---|---|
| 2,402,137 | 6/1946 | Hanford et al. | 260—614 |
| 2,402,512 | 6/1946 | Thurston | 260—347.2 |
| 2,440,800 | 5/1948 | Hanford et al. | 260—94.8 |
| 2,765,296 | 10/1956 | Strain | 260—88.3 |
| 2,868,837 | 1/1959 | Burland et al. | 260—537 |
| 2,949,474 | 8/1960 | Murdoch et al. | 260—348 |
| 2,996,504 | 8/1961 | Zimmermann et al. | 260—348 |
| 3,056,803 | 10/1962 | Marcus et al. | 260—345.1 |

OTHER REFERENCES

Fox et al., Tolomerization, U.S. Naval Research Laboratory Report 5190, Nov. 18, 1958, pp. 39 and 45 relied on.

WILLIAM H. SHORT, *Primary Examiner.*

HAROLD N. BURSTEIN, *Examiner.*